United States Patent
Hashimoto et al.

(10) Patent No.: US 8,272,688 B2
(45) Date of Patent: Sep. 25, 2012

(54) VEHICLE SEAT CONTROL APPARATUS AND CONTROL METHOD THEREOF

(75) Inventors: Syuzo Hashimoto, Toyota (JP); Morio Sakai, Toyota (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 13/140,158

(22) PCT Filed: Dec. 21, 2009

(86) PCT No.: PCT/IB2009/007836
§ 371 (c)(1),
(2), (4) Date: Jun. 16, 2011

(87) PCT Pub. No.: WO2010/073093
PCT Pub. Date: Jul. 1, 2010

(65) Prior Publication Data
US 2012/0032482 A1   Feb. 9, 2012

(30) Foreign Application Priority Data

Dec. 25, 2008   (JP) ................................ 2008-330389

(51) Int. Cl.
*B60N 2/42* (2006.01)
*G06F 7/00* (2006.01)
(52) U.S. Cl. ....................... 297/217.3; 701/49
(58) Field of Classification Search .............. 297/216.13, 297/216.1; 701/49
See application file for complete search history.

(56) References Cited

U.S. PATENT DOCUMENTS

| | | | |
|---|---|---|---|
| 5,097,185 A | * | 3/1992 | Ogasawara .................... 318/268 |
| 7,200,474 B2 | * | 4/2007 | Motozawa et al. ............. 701/45 |
| 7,918,302 B2 | * | 4/2011 | Sakai et al. .................... 180/274 |
| 2004/0212226 A1 | | 10/2004 | Bethge et al. |
| 2005/0146174 A1 | * | 7/2005 | Maddelein et al. ........ 297/216.1 |
| 2006/0175116 A1 | | 8/2006 | Friedman et al. |
| 2007/0185635 A1 | | 8/2007 | Mattes et al. |
| 2008/0262679 A1 | | 10/2008 | Baumann et al. |

FOREIGN PATENT DOCUMENTS

| | | |
|---|---|---|
| DE | 10 2005 047 905 A1 | 4/2007 |
| EP | 1 609 664 A2 | 12/2005 |

(Continued)

OTHER PUBLICATIONS

International Search Report for International Patent Application No. PCT/IB2009/007836, mailed on May 7, 2010.

(Continued)

*Primary Examiner* — Sarah B McPartlin
(74) *Attorney, Agent, or Firm* — Oliff & Berridge, PLC

(57) ABSTRACT

A vehicle seat control apparatus includes an adjusting device that adjusts a reclining angle of a seat back of a vehicle seat, and a control portion that controls the adjusting device. When adjusting the reclining angle, the control portion controls the adjusting device to start adjusting the reclining angle at a first speed, and then after a predetermined period of time passes, the control portion controls the adjusting device to adjust the reclining angle at a second speed that is faster than the first speed. The invention also relates to a control method of this vehicle seat control apparatus.

10 Claims, 9 Drawing Sheets

FOREIGN PATENT DOCUMENTS

| | | |
|---|---|---|
| EP | 1 612 095 A2 | 1/2006 |
| JP | A-6-86577 | 3/1994 |
| JP | A-2005-119646 | 5/2005 |
| JP | A-2007-500650 | 1/2007 |
| JP | A-2007-99185 | 4/2007 |
| JP | A-2008-504168 | 2/2008 |
| WO | WO 01/45985 A1 | 6/2001 |

OTHER PUBLICATIONS

Written Opinion for International Patent Application No. PCT/IB2009/007836, mailed on May 7, 2010.

Notification of Reason(s) for Refusal for priority Japanese Patent Application No. 2008-330389, dated Oct. 7, 2010 (w/ partial translation).

* cited by examiner

VEHICLE SEAT CONTROL APPARATUS AND CONTROL METHOD THEREOF

BACKGROUND OF THE INVENTION

1. Field of the Invention

The invention relates to a vehicle seat control apparatus and a control method thereof, and more particularly, to a seat control apparatus and a control method thereof that adjusts the angle of a seat back of a vehicle seat.

2. Description of the Related Art

Vehicle seats that adjust the angle of the seat back by driving an actuator such as a motor are in wide use. Technology that controls the angle adjustment of a seat back and the like has also been proposed.

Japanese Patent Application Publication No. 2007-500650 (JP-A-2007-500650), for example, proposes technology that controls the angle adjustment of a seat back. The technology described in JP-A-2007-500650 predicts a collision and operates an actuator for adjusting a seat at a second speed that is faster than a first speed that is used to make a comfortable adjustment, when a collision has been predicted.

The technology described in JP-A-2007-500650 adjusts the angle of the seat back at a speed that is faster than the speed at which the seat back is adjusted by an operation by the user, when a collision has been predicted. However, fast and sudden starts and stops may be uncomfortable and annoying to the occupant, so there is room for improvement regarding the control when adjusting the angle of the seat back.

SUMMARY OF THE INVENTION

This invention therefore provides a vehicle seat control apparatus and a control method thereof that minimizes discomfort and annoyance to an occupant during control to adjust the reclining angle of a seat back.

Thus, one aspect of the invention relates to a vehicle seat control apparatus that includes an adjusting device that adjusts a reclining angle of a seat back of a vehicle seat, and a control portion that controls the adjusting device. When adjusting the reclining angle, the control portion controls the adjusting device to start adjusting the reclining angle at a first speed, and then after a predetermined period of time passes, the control portion controls the adjusting device to adjust the reclining angle at a second speed that is faster than the first speed.

According to this vehicle seat control apparatus, the adjusting device adjusts the reclining angle of a seat back of a vehicle seat.

Also, when adjusting the reclining angle, the control portion controls the adjusting device to start adjusting the reclining angle at a first speed, and then after a predetermined period of time passes, the control portion controls the adjusting device to adjust the reclining angle at a second speed that is faster than the first speed.

That is, the adjusting device starts to adjust the reclining angle of the seat back at a first speed that is slower than a second speed, and then adjusts the reclining angle of the seat back at the second speed that is faster than the first speed. As a result, discomfort and annoyance to the occupant from the operation of the seat back is able to be minimized compared with when the adjustment of the reclining angle of the seat back is started at the second speed right from the start. Also, operational noise and shock from the meshing of the gears and the like that form the operating mechanism of the seat back can also be minimized.

Incidentally, the vehicle seat control apparatus described above may also include an operating portion that is operated by an occupant and instructs the adjusting device to make an adjustment. The control portion may control the adjusting device to start adjusting the reclining angle at the first speed when there is an instruction to make the adjustment from the operating portion. As a result, discomfort and annoyance to the occupant from the operation of the seat back can be minimized when the reclining angle of the seat back is adjusted in response to the instruction by the occupant.

Also, in the vehicle seat control apparatus described above, when the control portion controls the adjusting device to stop adjusting the reclining angle, the control portion may control the adjusting device to stop the adjustment after gradually decreasing the adjusting speed. As a result, discomfort and annoyance to the occupant can be minimized also when the adjustment of the reclining angle of the seat back is stopped.

The vehicle seat control apparatus described above may also include a collision predicting portion that predicts a collision. When the collision is predicted by the collision predicting portion, the control portion may control the adjusting device to start adjusting the reclining angle at a third speed that is faster than the first speed, and then after a predetermined period of time passes, adjust the reclining angle at a fourth speed that is faster than the third speed, such that the reclining angle comes to match a target angle.

According to this vehicle seat control apparatus, the collision predicting portion predicts a collision.

Also, when the collision is predicted by the collision predicting portion, the control portion controls the adjusting device to start adjusting the reclining angle at a third speed that is faster than the first speed, and then after a predetermined period of time passes, adjust the reclining angle at a fourth speed that is faster than the third speed, such that the reclining angle comes to match a target angle. That is, shock when the seat back is suddenly operated can be reduced, so discomfort and annoyance to the occupant when the seat back is suddenly operated can be minimized. The target angle is intended to include a target angle range that covers a certain range. In this case, it is sufficient that the control portion controls the adjusting device to make the reclining angle match a numerical value within the target angle range.

Incidentally, in the vehicle seat control apparatus described above, the control portion may control the adjusting device to stop the reclining angle at the target angle after gradually decreasing the adjusting speed before the reclining angle reaches the target angle. As a result, when stopping the seat back after it is urgently operated, the seat back is stopped after gradually decreasing the speed at which the seat back is operated. As a result, the operating feeling is improved and discomfort and annoyance to the occupant can be minimized.

In the vehicle seat control apparatus described above, a zone between the reclining angle when the adjustment is started and the target angle may include a preset first zone immediately after the adjustment of the reclining angle is started, a preset second zone immediately before the reclining angle reaches the target angle, and a third zone in between the first zone and the second zone. Also, the control portion may control the adjusting device such that an adjusting speed of the adjusting device in at least one of the first zone and the second zone is slower than the adjusting speed in the third zone.

According to this vehicle seat control apparatus, the zone between the reclining angle when the adjustment is started and the target angle includes a preset first zone immediately after the adjustment of the adjusting device is started, a preset second zone immediately before the reclining angle reaches the target angle, and a third zone in between the first zone and the second zone. Also, the control portion controls the adjusting device such that the adjusting speed of the adjusting device in at least one of the first zone and the second zone is slower than the adjusting speed in the third zone.

That is, when a collision is predicted and the seat back is urgently adjusted, at least one of the adjusting speed in the first zone immediately after the adjustment is started and the adjusting speed in the second zone immediately before the adjustment is ended is made slower than the adjusting speed in the third zone that is a middle zone between the first zone and the second zone. Therefore, discomfort and annoyance to the occupant from the operation of the seat back can be minimized.

Incidentally, in the vehicle seat control apparatus described above, the collision predicting portion may calculate a predicted time-to-collision that is a predicted time until the collision occurs. Also, the control portion may determine whether the reclining angle is able to be adjusted to the target angle within the predicted time-to-collision. Further, when the control portion determines that the reclining angle is unable to be adjusted to the target angle within the predicted time-to-collision, the control portion may control the adjusting device to prohibit the adjustment at the third speed and start the adjustment at the fourth speed. As a result, when the seat back is urgently operated and the adjustment operation is unable to be completed by the time of the collision, adjustment at the third speed is prohibited, and the seat back can be operated appropriately. Also, at this time, the collision predicting portion may update the predicted time-to-collision, and the control portion may determine whether the reclining angle is able to be adjusted to the target angle within an updated predicted time-to-collision based on the updated predicted time-to-collision, and control the adjusting device based on a determination result determined by the control portion. As a result, the seat back is able to be operated appropriately reflecting the ever-changing situation outside the vehicle. For example, after the control portion controls the adjusting device to prohibit the adjustment at the third speed and start the adjustment at the fourth speed, the control portion may control the adjusting device such that the adjusting speed in the second zone becomes slower than the adjusting speed in the third zone when it is determined that the reclining angle is able to be adjusted to the target angle within the updated predicted time-to-collision.

Also, in the vehicle seat control apparatus described above, when the control portion controls the adjusting device to change the adjusting speed of the adjusting device, the control portion may control the adjusting device such that the adjusting speed changes gradually. As a result, the feeling when the seat back is adjusted can be improved even more. Also, an aspect of invention relates to a control method for the vehicle seat control apparatus as described above.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
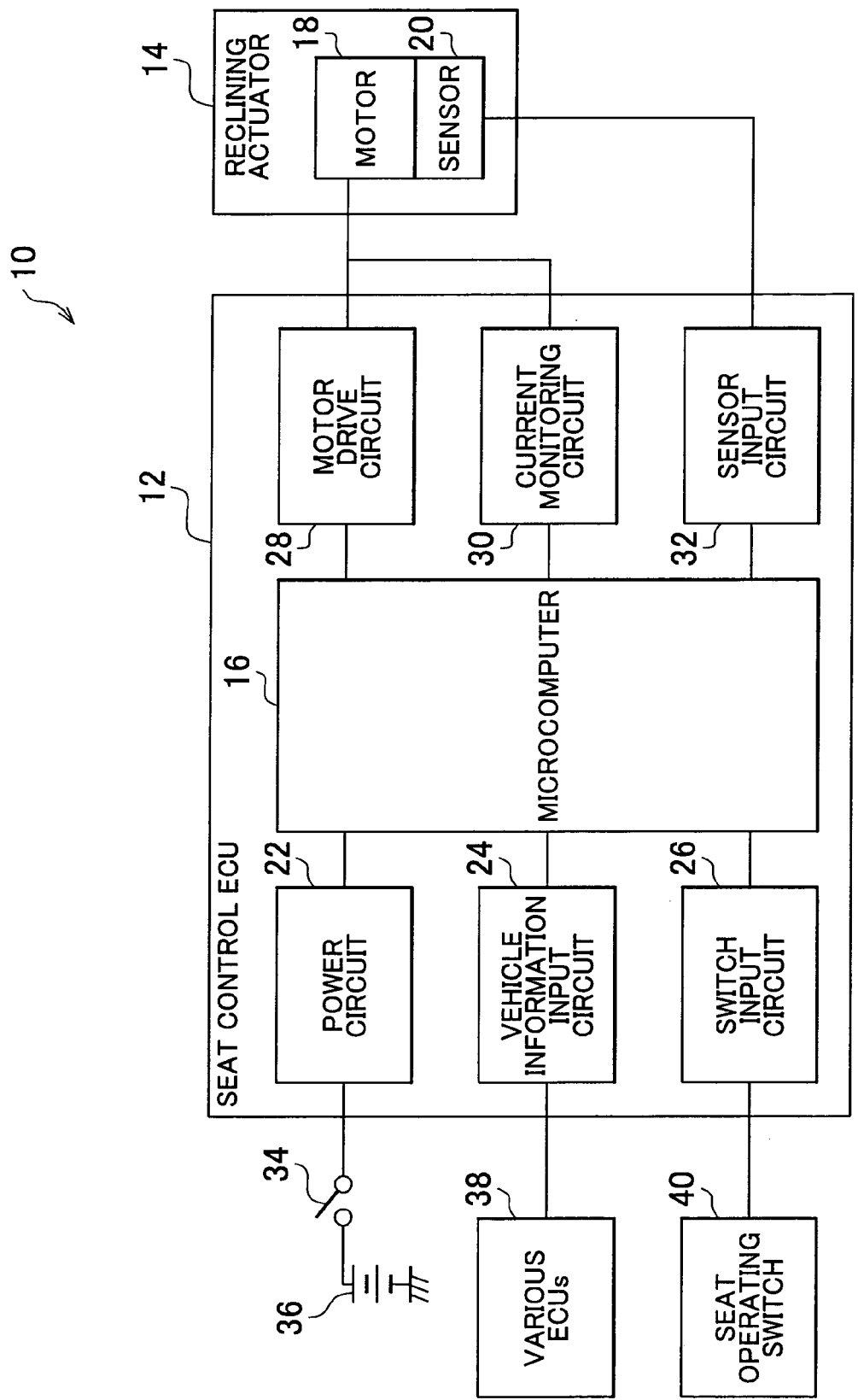
FIG. 1 is a block diagram of the general structure of a vehicle seat control apparatus according to a first example embodiment of the invention.
Figure 2A:
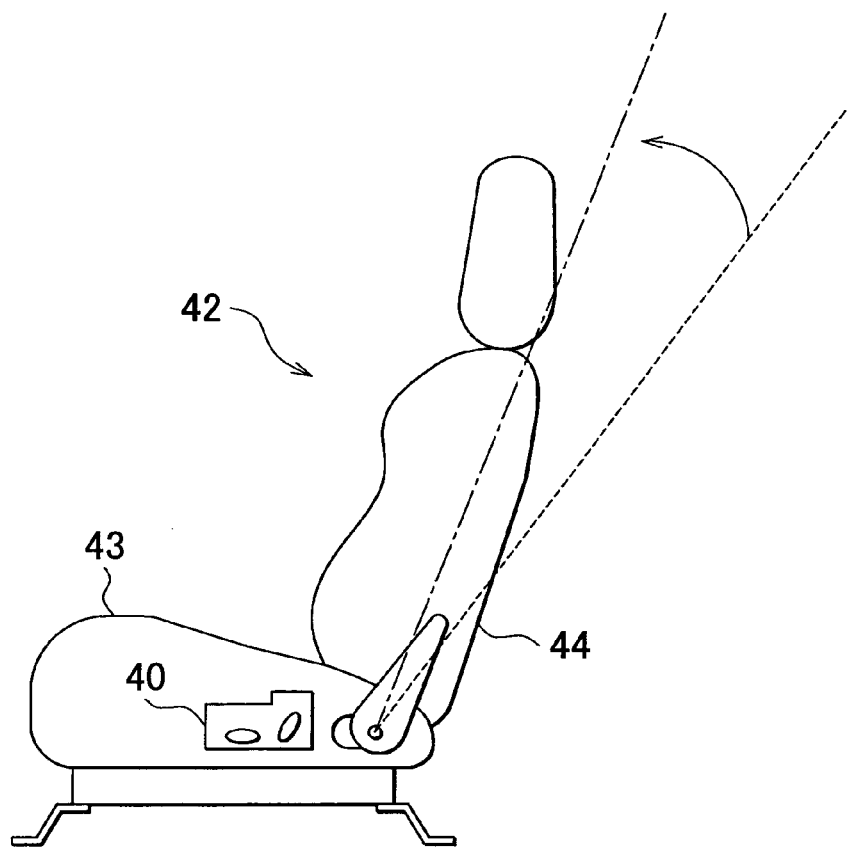
FIG. 2A is a view of one example of an arrangement of a seat operating switch.
Figure 2B:
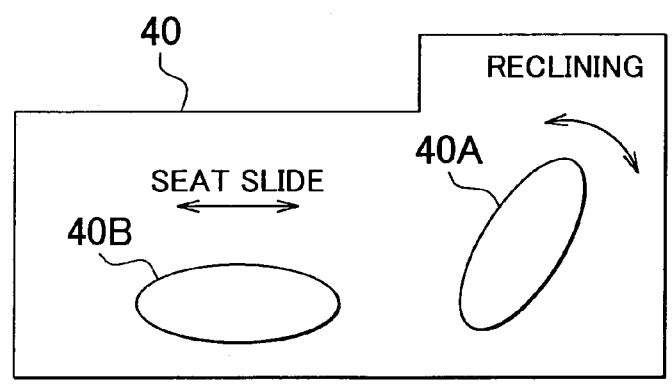
FIG. 2B is a view of one example of the seat operating switch.

A first example embodiment of the present invention will be described in greater detail below with reference to the accompanying drawings. FIG. 1 is a block diagram of the general structure of a vehicle seat control apparatus, FIG. 2A is a view of one example of an arrangement of a seat operating switch 40 in a seat 42, and FIG. 2B is a view of one example of the seat operating switch 40.

A vehicle seat control apparatus 10 includes a seat control ECU 12 (i.e., a control portion) for performing drive control of a seat back 44 of the vehicle seat 42, and a reclining actuator 14 (i.e., an adjusting device) for adjusting the reclining angle of the seat back 44 with respect to a seat cushion 43 (i.e., the angle between the seat back 44 and the seat cushion 43) by driving a reclining mechanism of the vehicle seat 42.

The seat control ECU 12 includes a microcomputer 16 that has a CPU, ROM, RAM, and an input/output interface. The reclining actuator 14 includes a motor 18 and a sensor 20 for detecting the position (i.e., the reclining angle) of the seat back 44. Incidentally, the sensor 20 detects the reclining angle of the seat back 44 by detecting the rotation speed and rotational position and the like of the motor 18 using a Hall element, for example.

A power circuit 22, a vehicle information input circuit 24, a switch input circuit 26, a motor drive circuit 28, a current monitoring circuit 30, and a sensor input circuit 32 are connected to the microcomputer 16.

The power circuit 22 is connected to a battery 36 via a switch 34 and supplies power from the battery 36 to the microcomputer 16 and the like.

The vehicle information input circuit 24 is connected to various ECUs 38 that perform various control of the vehicle, so as to be able to communicate with those various ECUs 38.

The switch input circuit 26 is connected to a seat operating switch 40 (i.e., an operating portion) that is operated by an occupant to adjust the seat back 44 and a longitudinal position of the vehicle seat 42 (i.e., seat slide position) and the like. The seat operating switch 40 is provided on the side of the vehicle seat 42, as shown in FIG. 2A, for example. Also, the seat operating switch 40 includes a switch 40A used to adjust the reclining angle of the seat back 44, and a switch 40B used to adjust a longitudinal position of the vehicle seat 42 (i.e., seat slide position), as shown in FIG. 2B.

The motor 18 for driving the reclining actuator 14 is connected to the motor drive circuit 28 and is driven by this motor drive circuit 28. The motor 18 drives the reclining mechanism for adjusting the reclining angle of the seat back 44. Also, the driving speed of the motor 18 is varied according to the current supplied from the motor drive circuit 28 and the like.

The current monitoring circuit 30 detects the current supplied to the motor 18 from the motor drive circuit 28, and outputs a detection value to the microcomputer 16. The microcomputer 16 then controls the rotation speed of the motor 18 and the like based on this detection value of the current monitoring circuit 30.

The sensor 20 of the reclining actuator 14 is connected to the sensor input circuit 32, and a detection value of this sensor 20 is output to the microcomputer 16.

In this example embodiment, the collision predicting ECU 46 (i.e., a collision predicting portion) that predicts a collision is connected as one of the various ECUs 38 to the vehicle information input circuit 24, as shown in FIG. 1.

Figure 3:
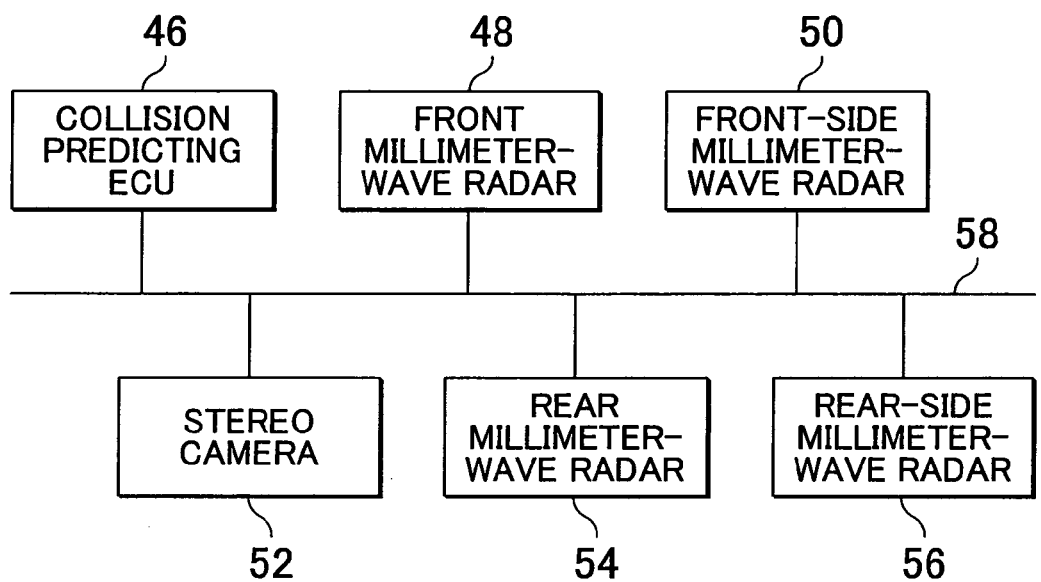
FIG. 3 is a block diagram of an example of a structure for determining a collision and a collision predicting ECU that is connected to a vehicle seat control ECU according to the first example embodiment of the invention.

The collision predicting ECU 46 is connected to a bus 58, as shown in FIG. 3. Also connected to the bus 58 are a front millimeter-wave radar 48 for detecting the distance to an obstacle in front of the host vehicle, a front-side millimeter-wave radar 50 for detecting the distance to an obstacle to the side in front of the host vehicle, a stereo camera 52 that captures an image of the area in front of the host vehicle, a rear millimeter-wave radar 54 for detecting the distance to an obstacle in back of the host vehicle, and a rear-side millimeter-wave radar 56 for detecting the distance to an obstacle to the side in back of the host vehicle.

The front millimeter-wave radar 48, the front-side millimeter-wave radar 50, the stereo camera 52, the rear millimeter-wave radar 54, and the rear-side millimeter-wave radar 56 monitor the area around the host vehicle and output the monitoring results to the collision predicting ECU 46.

The front millimeter-wave radar 48 is provided near the center of the front grille, for example. Also, the front-side millimeter-wave radar 50 is provided near each end in the width direction in the front bumper, for example. The front millimeter-wave radar 48 and the front-side millimeter-wave radar 50 emit millimeter waves to the front and the front-side of the host vehicle, respectively, and receive the radio waves that have been reflected off of an object. The front millimeter-wave radar 48 and the front-side millimeter-wave radar 50 are provided to measure the relative speed and distance from the host vehicle to the object, for example, based on the travel time of the radio waves and the frequency difference that occurs due to the Doppler effect, and the like. Also, the rear millimeter-wave radar 54 and the rear-side millimeter-wave radar 56 are provided in the rear bumper or the like. The rear millimeter-wave radar 54 and the rear-side millimeter-wave 56 emit millimeter waves to the rear and the rear-side of the host vehicle, respectively, and receive the radio waves that have been reflected off of an object. The rear millimeter-wave radar 54 and the rear-side millimeter-wave radar 56 are provided to measure the relative speed and distance from the host vehicle to the object, for example, based on the travel time of the radio waves and the frequency difference that occurs due to the Doppler effect, and the like.

The stereo camera 52 is provided on an upper portion of the front windshield inside the vehicle cabin in a position near the center in the vehicle width direction. The stereo camera 52 is provided to capture an image of the area in front of the host vehicle, detect an obstacle in front of the vehicle, and measure the distance from the host vehicle to that obstacle. Incidentally, because the distance from the host vehicle to an obstacle is able to be detected using the front millimeter-wave radar 48 and the front-side millimeter-wave radar 50 and the like, the stereo camera 52 may be omitted.

The collision predicting ECU 46 obtains the detection values from the front millimeter-wave radar 48, the front-side millimeter-wave radar 50, the stereo camera 52, the rear millimeter-wave radar 54, and the rear-side millimeter-wave radar 56, and predicts whether there will be a collision. Since various well-known technologies can be employed to predict a collision, a detailed description will be omitted. For example, the collision predicting ECU 46 obtains the relative speed from the change in distance from the host vehicle to the obstacle based on the detection values from the front millimeter-wave radar 48, the front-side millimeter-wave radar 50, the stereo camera 52, the rear millimeter-wave radar 54, and the rear-side millimeter-wave 56, and, calculates the predicted time-to-collision. If the predicted time-to-collision t that is calculated is within a preset time, the collision predicting ECU 46 determines that a collision is imminent.

With the vehicle seat control apparatus 10 structured as described above, when there is a command to adjust the reclining angle of the seat back 44 in response to the seat operating switch 40 being operated by the occupant, the microcomputer 16 controls the motor drive circuit 28. More specifically, the motor 18 is driven in the direction indicated by the seat operating switch 40. Accordingly, the reclining angle of the seat back 44 is adjusted.

Incidentally, sudden operation or stopping of the seat back 44 when adjusting the reclining angle of the seat back 44 may be uncomfortable and annoying to the occupant.

Therefore, in this example embodiment, when the adjustment of the reclining angle of the seat back 44 is started by driving the motor 18 in response to an operation of the seat operating switch 40, the motor 18 is not started suddenly, but instead starts to be driven at a first speed. Then after the motor 18 starts to be driven at the first speed, the rotation speed of the motor 18 is gradually increased to a second speed that is faster than the first speed. Also, when the seat back 44 stops being adjusted as a result of the command to adjust the reclining angle of the seat back 44 from the seat operating switch 40 ending, the motor 18 is not immediately stopped, but is instead gradually slowed from the second speed and then stopped. As a result, discomfort and annoyance to the occupant can be minimized. Incidentally, when increasing and decreasing the rotation speed of the motor 18, the speed is changed gradually, which further improves the feeling.

In this example embodiment, the reclining angle of the seat back is adjusted to match a preset target angle if a collision is predicted by the collision predicting ECU 46. As a result, at the time of collision, the posture of the occupant will be appropriate, thus enabling an occupant restraint device such as a seat belt or an air bag apparatus to reliably protect the occupant. The target angle may include a target angle range that covers a certain range.

More specifically, the collision predicting ECU 46 calculates the predicted time-to-collision t by calculating the relative speed from the change in distance from the host vehicle to the obstacle that can be obtained from the front millimeter wave radar 48, the front-side millimeter wave radar 40, the stereo camera 52, the rear millimeter radar 54, and the rear-side millimeter wave radar 56. If the predicted time-to-collision t that is calculated is less than a preset time t1, the collision predicting ECU 46 determines that a collision is imminent. In this case, the collision predicting ECU 46 outputs a command signal to the seat control ECU 12 to operate the motor 18 at high speed. When this command signal is output from the collision predicting ECU 46, the seat control ECU 12 controls the motor drive circuit 28 to drive the motor 18 at a speed that is faster than the speed at which it is driven when the seat is adjusted normally (i.e., when the seat is adjusted by operating the seat operating switch 40). As a result, the reclining angle of the seat back 44 is adjusted so that it matches a preset target angle.

Also, when the set control ECU 12 starts to drive motor 18 at a speed faster than the speed at which the motor 18 is driven during normal seat adjustment in response to a command signal being output from the collision predicting ECU 46, the seat control ECU 12 gradually increases the rotation speed of the motor 18 from a third speed to a fourth speed that is faster than the third speed. Also, when stopping the motor 18 from the fourth speed, the seat control ECU 12 controls the motor 18 to first gradually slow down from the fourth speed and then stop. As a result, discomfort and annoyance to the occupant when starting and stopping an adjustment of the reclining angle of the seat back 44 can be minimized. Incidentally, the relationships among the first to the fourth speeds in this example embodiment are first speed<second speed<third speed<fourth speed. Alternatively, however, they may be first speed<third speed<second speed<fourth speed, or third speed<first speed<second speed<fourth speed, or first speed=third speed<second speed<fourth speed, or first speed<second speed=third speed<fourth speed.

Figure 4:
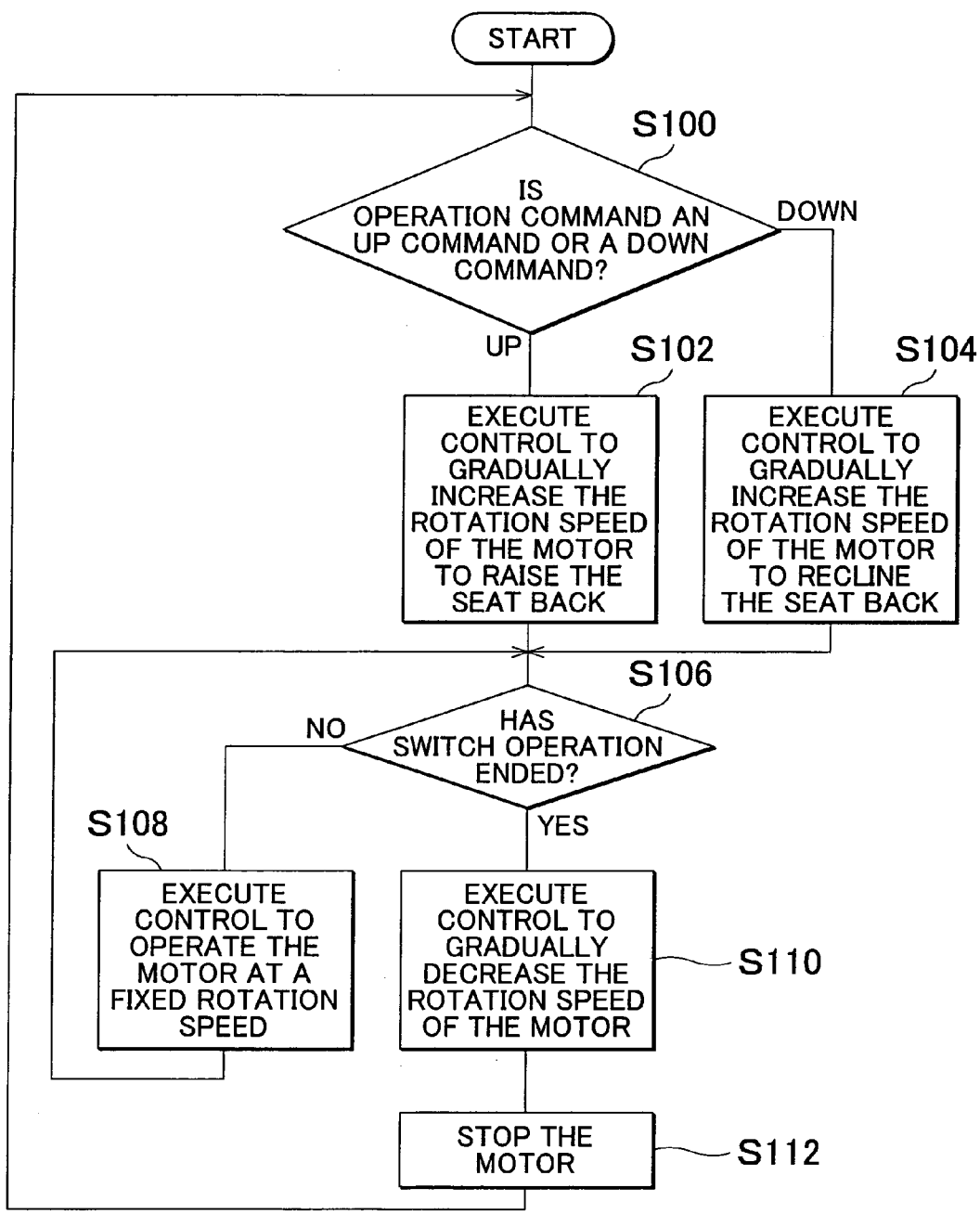
FIG. 4 is a flowchart illustrating a routine executed by the seat control ECU when adjusting the reclining angle of a seat back in response to operation of a seat operating switch, in the vehicle seat control apparatus according to the first example embodiment of the invention.

Continuing on, a routine executed by the seat control ECU 12 when adjusting the reclining angle of the seat back 44 in response to operation of the seat operating switch 40 in the vehicle seat control apparatus 10 will now be described. FIG. 4 is a flowchart illustrating the routine executed by the seat control ECU when adjusting the reclining angle of the seat back 44 in response to operation of a seat operating switch 40 in the vehicle seat control apparatus 10 according to a first example embodiment of the invention. Incidentally, the routine shown in FIG. 4 is started when there is a command (an instruction) to adjust the reclining angle of the seat back 44 in response to operation of the seat operating switch 40.

First, when there is a command to adjust the reclining angle of the seat back 44 in response to operation of the seat operating switch 40 by the occupant, the microcomputer determines in step 100 whether the operation command is an UP command or a DOWN command. This determination is made by determining whether the command by the seat operating switch 40 to an adjustment command to raise the seat back 44, or an adjustment command to recline the seat back 44. If the command is an UP command, the process proceeds on to step 102. If the command is a DOWN command, the process proceeds on to step 104.

In step 102, control is executed to gradually increase the speed of the motor 18 to raise the seat back 44. That is, the microcomputer 16 controls the motor drive circuit 28 to start driving the motor 18 to raise the seat back 44. At this time, the motor 18 is started to be driven at the first speed, and then the speed of the motor 18 is gradually increased to the second speed such that the speed of the motor 18 becomes the second speed after a predetermined period of time has passed after the motor 18 has been started. After step 102, the process proceeds on to step 106.

In step 104, control is executed to gradually increase the speed of the motor 18 to recline the seat back 44. That is, the microcomputer 16 controls the motor drive circuit 28 to start driving the motor 18 to recline the seat back 44. At this time, the motor 18 is started to be driven at the first speed, and then the speed of the motor 18 is gradually increased to the second speed such that the speed of the motor 18 becomes the second speed after a predetermined period of time has passed after the motor 18 has been started. After step 104, the process proceeds on to step 106.

That is, the rotation speed of the motor 18 is gradually increased after the seat back 44 has been started to be adjusted by executing control to gradually increase the rotation speed of the motor 18 when raising the seat back 44 as well as when reclining the seat back 44. As a result, shock when adjusting the seat back 44 can be reduced so discomfort and annoyance to the occupant from adjusting the seat back 44 can be minimized. Also, operating noise when the adjustment of the reclining angle is started, which is caused by play in the gears and the like of the reclining mechanism that adjusts the reclining angle of the seat back 44, can also be minimized.

In step 106, the microcomputer determines whether a switch operation of the seat operating switch 40 has ended. If the determination is no, the process proceeds on to step 108. If the determination is yes, the process proceeds on to step 110.

In step 108, the microcomputer 16 executes control to operate the motor 18 at a fixed rotation speed. That is, the microcomputer 16 controls the motor drive circuit 28 to fix the rotation speed of the motor 18 at the second speed while monitoring the detection value from the sensor 20 via the sensor input circuit 32. After step 108, the process returns to step 106.

On the other hand, in step 110 the microcomputer 16 performs control to gradually decrease the rotation speed of the motor 18. That is, the microcomputer 16 controls the motor drive circuit 28 to gradually decrease the rotation speed of the motor 18 while monitoring the detection value from the sensor 20 via the sensor input circuit 32. As a result, shock can be reduced when the adjustment of the reclining angle of the seat back 44 is ended, so discomfort and annoyance to the occupant from adjusting the seat back 44 can be minimized. After step 110, the process proceeds on to step 112.

Then in step 112, the microcomputer 16 controls the motor drive circuit 28 to stop the motor 18, after which this process returns to step 100 and the routine is repeated.

Figure 5:
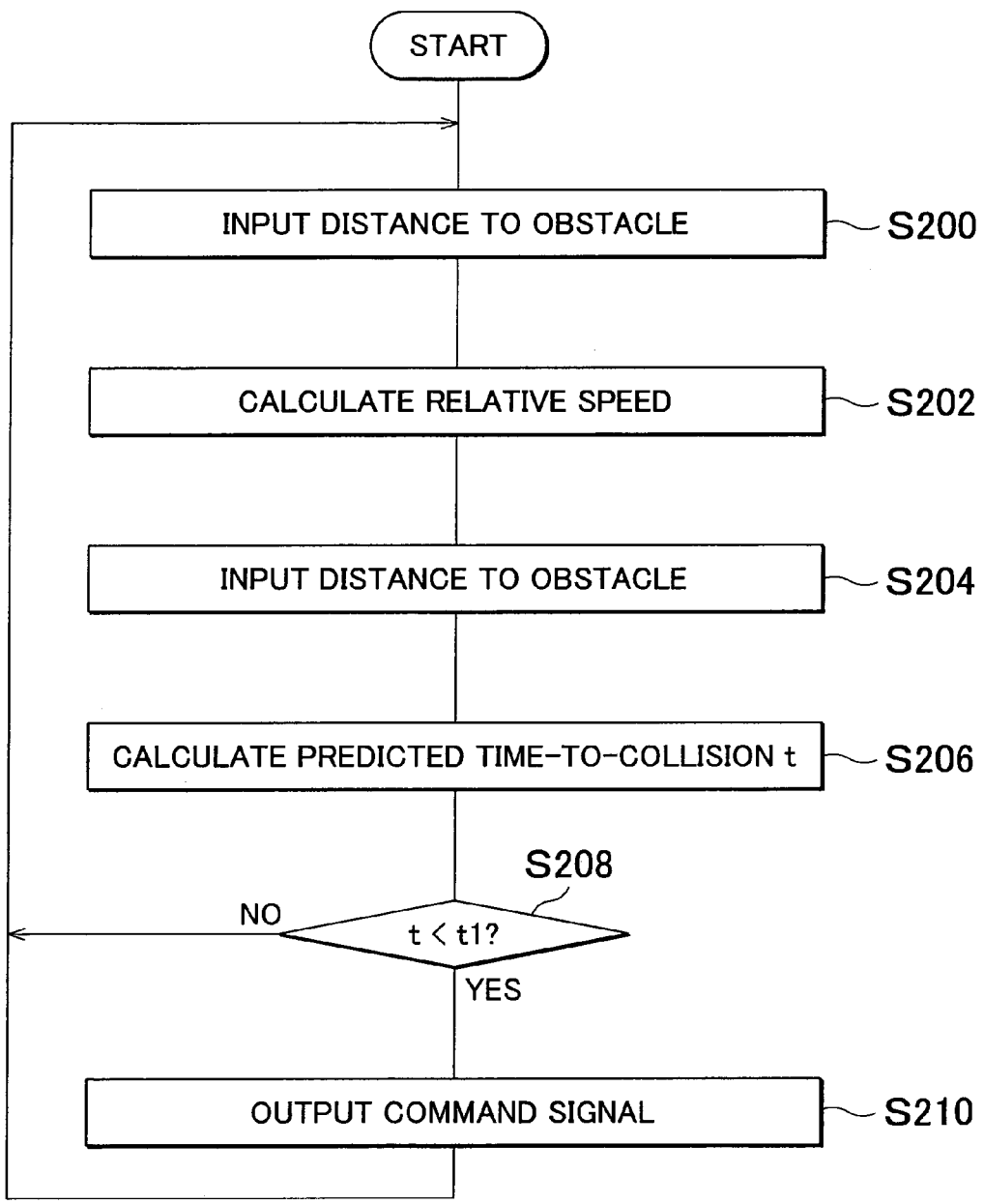
FIG. 5 is a flowchart illustrating a routine executed by the collision predicting ECU that is connected to the vehicle seat control apparatus according to the first example embodiment of the invention.

Next a routine executed by the collision predicting ECU 46 that is connected to the vehicle seat control apparatus 10 according to the first example embodiment of the invention structured as described above will be described. FIG. 5 is a flowchart illustrating the routine executed by the collision predicting ECU 46. Incidentally, the routine in FIG. 5 starts when an ignition switch, not shown, is turned on and stops when the ignition switch is turned off or a collision occurs or the like.

In step 200, the distance from the host vehicle to the obstacle is input. That is, the detection values from the front millimeter wave radar 48, the front-side millimeter wave radar 50, the stereo camera 52, and the rear millimeter wave radar 54, the rear-side millimeter wave radar 56 and the like are input to the collision predicting ECU 46. After step 200, the process proceeds on to step 202.

In step 202, the relative speed is calculated. For example, the relative speed is calculated from the distance to the obstacle detected at predetermined intervals of time by the millimeter wave radar (i.e., the front millimeter wave radar 48, the front-side millimeter wave radar 50, the rear millimeter wave radar 54, and the rear-side millimeter wave radar 56, and the like). Incidentally, the relative speed may also be calculated by obtaining the distance by image processing images from the stereo camera 16. After step 202, the process proceeds on to step 204.

In step 204, the detection values from the millimeter wave radars are newly input, after which the process proceeds on to step 206.

In step 206, the predicted time-to-collision t is calculated. That is, the time t until the host vehicle will collide with the obstacle is calculated from the relative speed and the distance to the obstacle. After step 206, the process proceeds on to step 208.

In step 208, it is determined whether the predicted time-to-collision t is less than a preset time t1. If the determination is yes, the process proceeds on to step 210. If the determination is no, the process returns to step 200 and the steps described above are repeated.

In step 210, a command signal is output to the seat control ECU 12 if a collision has been predicted. Then the process returns to step 200 and the routine is repeated.

Figure 6:
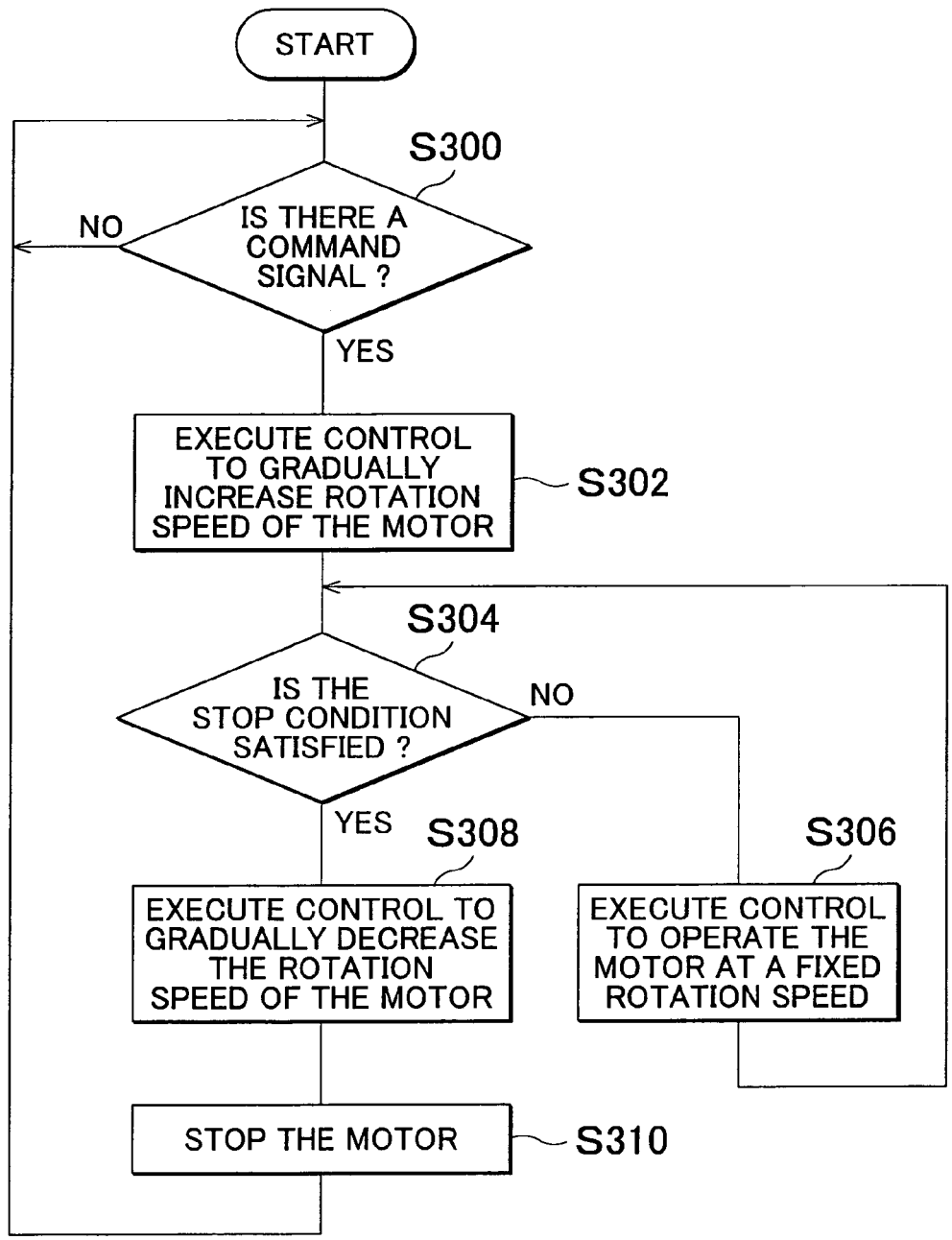
FIG. 6 is a flowchart illustrating a routine executed by the seat control ECU of the vehicle seat control apparatus according to the first example embodiment of the invention.

Continuing on, a routine executed by the seat control ECU 12 of the vehicle seat control apparatus 10 will be described. FIG. 6 is a flowchart executed by the seat control ECU 12 of the vehicle seat control apparatus according to the first example embodiment of the invention. Incidentally, the routine in FIG. 6 starts when an ignition switch, not shown, is turned on and stops when the ignition switch is turned off or a collision occurs or the like.

In step 300, the microcomputer 16 determines whether a command signal has been output from the collision predicting ECU 46. That is, the microcomputer 16 determines whether the command signal has been output in step 210 described above. This step is repeated until the determination is yes, and then the process proceeds on to step 302.

In step 302, control is executed to gradually increase the rotation speed of the motor 18. That is, the microcomputer 16 controls the motor drive circuit 28 to start to drive the motor 18. At this time, the motor 18 is started to be driven such that the rotation speed of the motor 18 is gradually increased from the third speed to the fourth speed. Incidentally, the rotation direction of the motor 18 is the direction that brings the reclining angle of the seat back 44 detected by the sensor 20 closer to the preset target angle. Also, the rotation speed of the motor 18 is increased from the third speed to the fourth speed in a preset zone (a first zone) immediately after the adjustment of the reclining angle is started, from among the zones between the reclining angle when the adjustment of the reclining angle of the seat back 44 is started and the target angle. After step 302, the process proceeds on to step 304. However, the rotation speed of the motor 18 may also gradually be increased from the third speed to the fourth speed within a predetermined period of time immediately after the adjustment of the reclining angle is started.

In step 304, the microcomputer 16 determines whether a preset stop condition is satisfied. In this determination, for example, the seat control ECU 12 obtains the detection value from the sensor 20 via the sensor input circuit 32 and determines whether the detected reclining angle matches the preset target angle, whether a preset period of time passes since the motor 18 is started to operate at high speed, and whether the motor load becomes equal to or greater than a preset load due to, for example, an object being caught in the seat adjusting mechanism or the like. If all of these determinations are no, the process proceeds on to step 306. However, if even one of these determinations is yes, the process proceeds on to step 308.

In step 306, the microcomputer 16 executes control to operate the motor 18 at a fixed rotation speed. That is, the microcomputer 16 controls the motor drive circuit 28 to fix the rotation speed of the motor 18 at fourth speed while monitoring the detection value from the sensor 20 via the sensor input circuit 32. After step 306, the process returns to step 304.

On the other hand, in step 308, the microcomputer 16 executes control to gradually decrease the rotation speed of the motor 18. That is, the microcomputer 16 controls the motor drive circuit 28 to gradually reduce the rotation speed of the motor 18, while monitoring the detection value from the sensor 20 via the sensor input circuit 32. Incidentally, the rotation speed of the motor 18 is gradually decreased in a preset zone (a second zone) right before the adjustment of the reclining angle is ended (i.e., right before the reclining angle matches the target angle), from among the zones between the reclining angle when the adjustment of the reclining angle of the seat back 44 is started and the target angle. However, the rotation speed of the motor 18 may also be gradually decreased from the fourth speed until the motor 18 stops, within a predetermined period of time right before the adjustment of the reclining angle is ended. Incidentally, the zones between the reclining angle when the adjustment of the reclining angle of the seat back 44 is started and the target angle include the first zone, the second zone, and a third zone that is between the first zone and the second zone. In the third zone, the rotation speed of the motor 18 is fixed at fourth speed, as is described above in step 306. After step 308, the process proceeds on to step 310.

Then in step 310, the microcomputer 16 controls the motor drive circuit 28 to stop the motor 18, after which the process returns to step 300 and the routine is repeated.

In this way, when adjusting the reclining angle of the seat back 44 with the vehicle seat control apparatus 10 according to this example embodiment, the rotation speed of the motor 18 is gradually increased when starting the adjustment and gradually decreased when stopping the adjustment. As a result, shock when the seat back 44 is adjusted is reduced, thereby minimizing discomfort and annoyance to the occupant.

Continuing on, a vehicle seat control apparatus according to a second example embodiment of the invention will now be described.

In the first example embodiment, the rotation speed of the motor 18 is gradually increased when the adjustment of the reclining angle of the seat back 44 is started, and gradually decreased when that is ended. However, it is conceivable that the reclining angle of the seat back 44 may be unable to be adjusted to the target angle by gradually increasing the rotation speed of the motor 18, depending on the position of the seat back 44 and the predicted time-to-collision t. Therefore, in this example embodiment, the predicted time-to-collision t is updated as needed, and it is determined whether the seat back 44 can be adjusted from its current position to the target angle within the predicted time-to-collision t. If this adjustment is not possible, control to gradually increase the rotation speed of the motor 18 when the adjustment is started is prohibited, and instead the motor 18 is driven at high speed from the start.

Incidentally, the vehicle seat control apparatus according to the second example embodiment has a structure similar to that of the vehicle seat control apparatus described in the first example embodiment so a detailed description of the structure will be omitted. Thus, the control when the seat back 44 is adjusted will be described.

Figure 7:
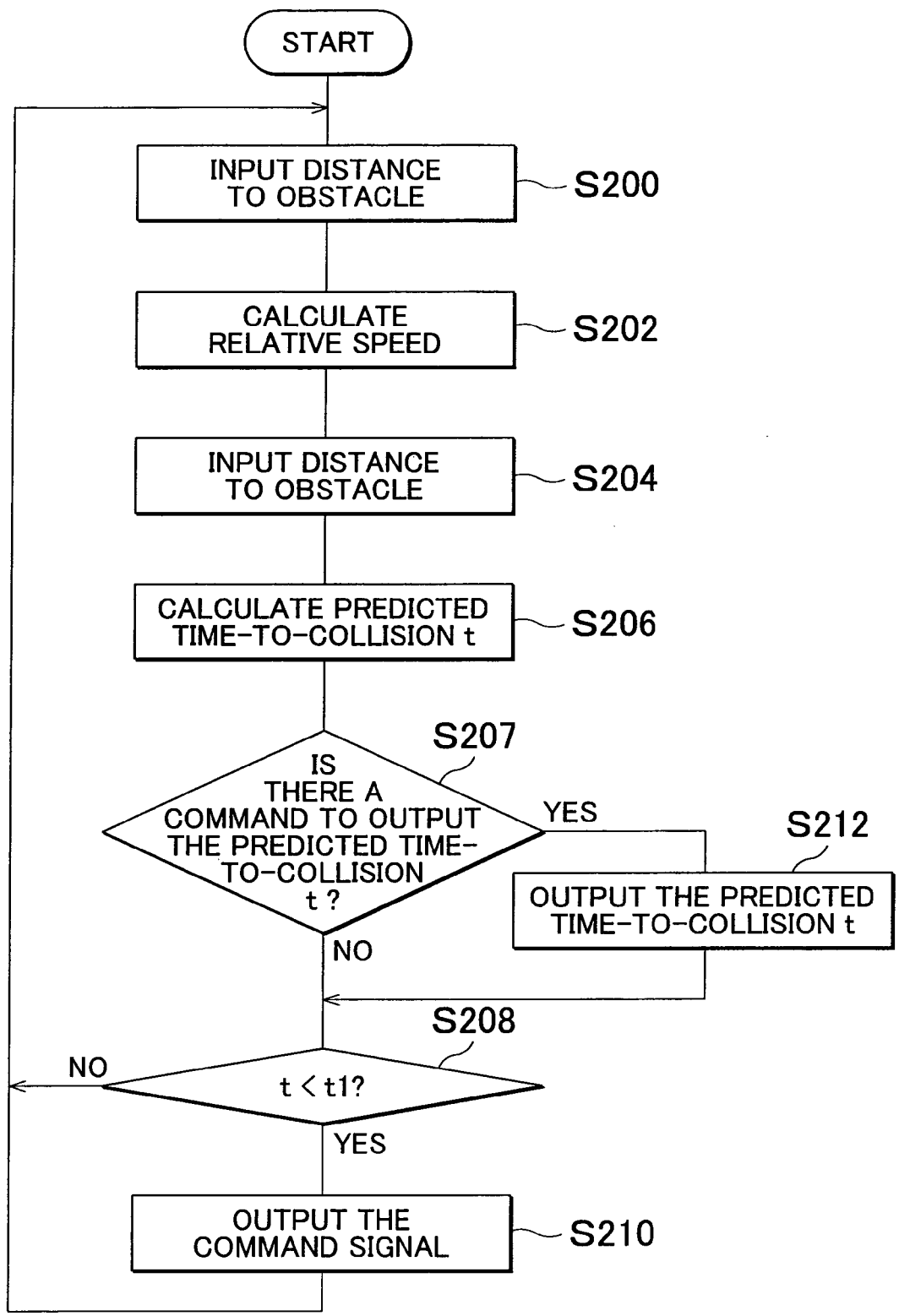
FIG. 7 is a flowchart illustrating a routine executed by the collision predicting ECU that is connected to the vehicle seat control apparatus according to a second example embodiment of the invention.

First, a routine executed by the collision predicting ECU 46 that is connected to the vehicle seat control apparatus according to the second example embodiment of the invention will be described. FIG. 7 is a flowchart illustrating the routine executed by the collision predicting ECU 46 that is connected to the vehicle seat control apparatus according to the second example embodiment of the invention. Incidentally, the routine in FIG. 7 starts when an ignition switch, not shown, is turned on and stops when the ignition switch is turned off or a collision occurs or the like. Also, steps that are the same as steps in the first example embodiment will be denoted by the same step numbers.

In step 200, the distance from the host vehicle to the obstacle is input. That is, the detection values from the front millimeter wave radar 46, the front-side millimeter wave radar 48, the stereo camera 52, the rear millimeter wave radar 54, and the rear-side millimeter wave radar 56 and the like are input to the collision predicting ECU 46. After step 200, the process proceeds on to step 202.

In step 202, the relative speed is calculated. For example, the relative speed is calculated from the distance to the obstacle detected at predetermined intervals of time by the millimeter wave radar (i.e., the front millimeter wave radar 46, the front-side millimeter wave radar 48, the rear millimeter wave radar 54, and the rear-side millimeter wave radar 56, and the like). Incidentally, the relative speed may also be calculated by obtaining the distance by image processing images from the stereo camera 52. After step 202, the process proceeds on to step 204.

In step 204, the detection values from the millimeter wave radar are newly input, after which the process proceeds on to step 206.

In step 206, the predicted time-to-collision t is calculated. That is, the time t until the host vehicle will collide with the obstacle is calculated from the relative speed and the distance to the obstacle. After step 206, the process proceeds on to step 207.

In step 207, it is determined whether there is a command to output the predicted time-to-collision t that has been calculated. This determination is made by determining whether there is command to output the predicted time-to-collision t from the seat control ECU 12. If the determination is yes, the process proceeds on to step 212. If the determination is no, the process proceeds on to step 208.

In step 212, the predicted time-to-collision t that has been calculated is output to the seat control ECU 12. That is, the predicted time-to-collision t is calculated from the relative speed calculated in step 202 and the distance to the obstacle detected by the front millimeter wave radar 48, the front-side millimeter wave radar 50, the stereo camera 52, the rear millimeter wave radar 54, and the rear-side millimeter wave radar 56 and the like, and this calculated predicted time-to-collision t is output to the seat control ECU 12 as needed. After step 212, the process proceeds on to step 208.

In step 208, it is determined whether the predicted time-to-collision t is less than a preset time t1. If the determination is yes, the process proceeds on to step 210. If the determination is no, the process returns to step 200 and the steps described above are repeated.

In step 210, a command signal is output to the seat control ECU 12 if a collision has been predicted. Then the process returns to step 200 and the routine is repeated.

Figure 8A:
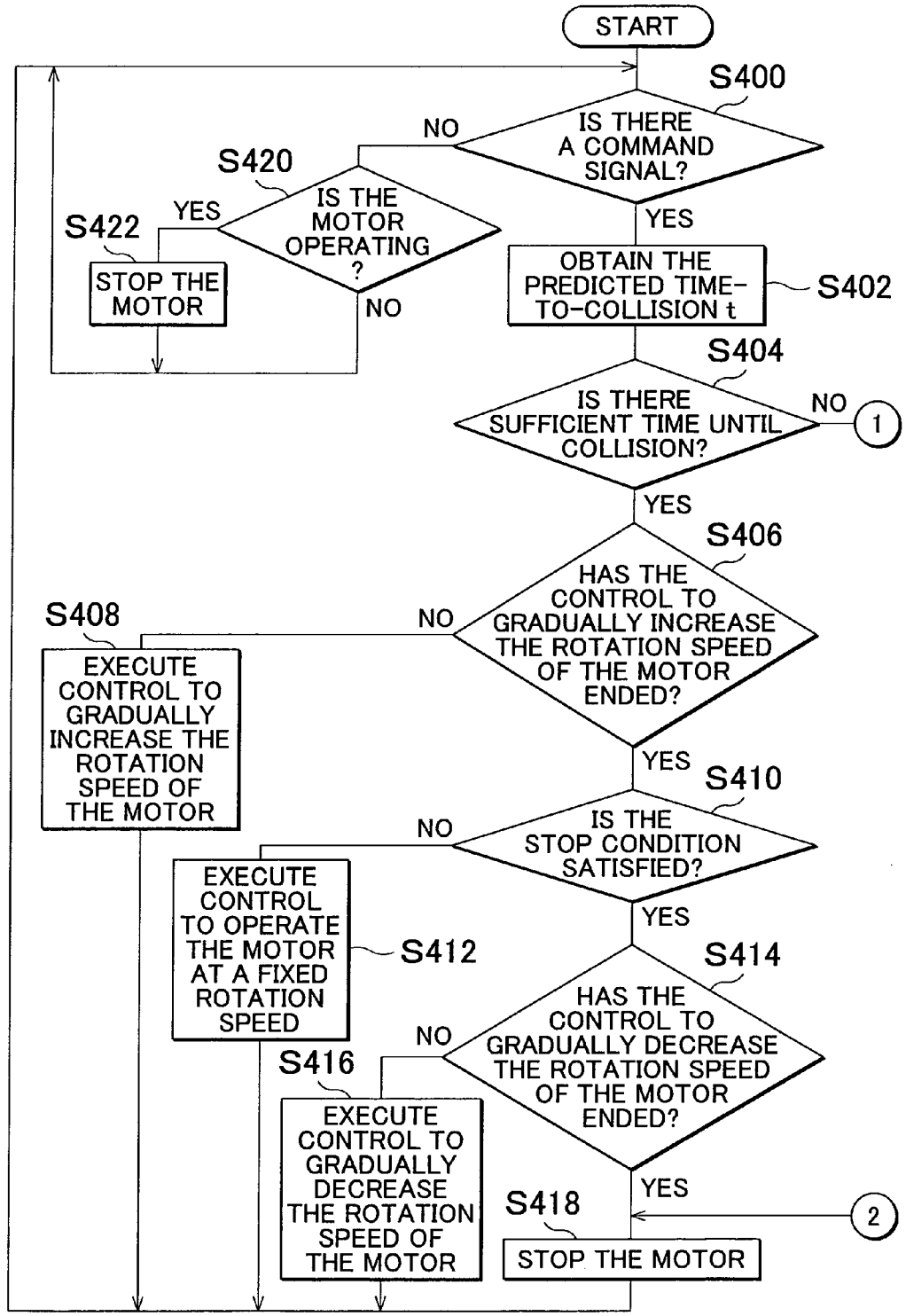
FIG. 8A is a part of a flowchart illustrating a routine executed by the seat control ECU of the vehicle seat control apparatus according to the second example embodiment of the invention.
Figure 8B:
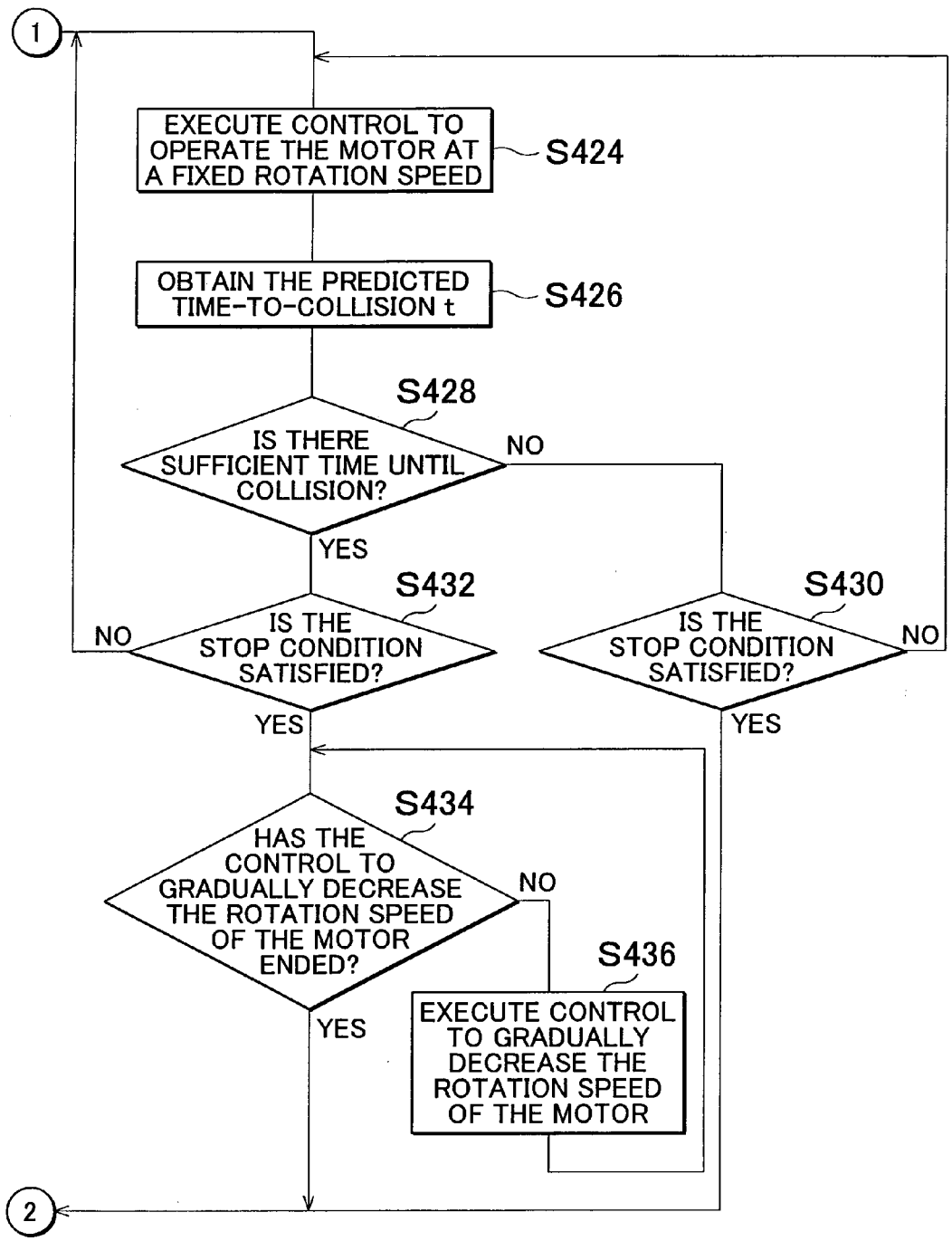
FIG. 8B is also a part of a flowchart illustrating a routine executed by the seat control ECU of the vehicle seat control apparatus according to the second example embodiment of the invention.

Continuing on, a routine executed by the seat control ECU 12 of the vehicle seat control apparatus will be described. FIG. 8A and FIG. 8B are a flowchart executed by the seat control ECU 12 of the vehicle seat control apparatus according to the second example embodiment of the invention. Incidentally, the routine in FIG. 8A and FIG. 8B starts when an ignition switch, not shown, is turned on and stops when the ignition switch is turned off or a collision occurs or the like.

In step 400, the microcomputer 16 determines whether a command signal has been output from the collision predicting ECU 46. That is, the microcomputer 16 determines whether the command signal has been output in step 210 described above. If the determination is yes, the process proceeds on to step 402. If, on the other hand, the determination is no, the process proceeds on to step 420.

In step 402, the microcomputer 16 obtains the predicted time-to-collision t from the collision predicting ECU 46. That is, the microcomputer 16 obtains the predicted time-to-collision t by the predetermined time-to-collision t being output from the collision predicting ECU 46 in step 212 after the determination in step 207 is yes. After step 402, the process proceeds on to step 404.

In step 404, the microcomputer 16 determines whether there is sufficient time until collision. In this determination, the operating time of the motor 18 to bring the seat back 44 from its current reclining angle to the target angle is predicted based on the angular difference between the current reclining angle detected by the sensor 20 and the target angle of the seat back 44, and the average speed in the first zone in which control is executed to gradually increase the rotation speed of the motor 18, the average speed in the second zone in which control is executed to gradually decrease the rotation speed of the motor 18, and the fourth speed which is the adjusting speed in the third zone between the first zone and the second zone. That is, the predicted operating time is calculated by dividing the angular difference by the angular speed, i.e., the rotation speed of the motor 18. By determining whether this operating time is equal to or less than the predicted time-to-collision t, it is determined whether the adjustment to the target angle is able to be completed within the predicted time-to-collision t even if control is performed to gradually increase and decrease the rotation speed of the motor 18. If the determination is yes, the process proceeds on to step 406. If the determination is no, the process proceeds on to step 424.

In step 406, the microcomputer 16 determines whether the control to gradually increase the rotation speed of the motor 18 has ended, as will be described later. If the determination is no, the process proceeds on to step 408. If the determination is yes, the process proceeds on to step 410.

In step 408, control to gradually increase the rotation speed of the motor 18 is executed. That is, the microcomputer 16 controls the motor drive circuit 28 to gradually increase the rotation speed of the motor 18 from the third speed to the fourth speed. As a result, shock when the adjustment of the reclining angle is started is reduced, thereby minimizing discomfort and annoyance to the occupant. Incidentally, the control to gradually increase the rotation speed of the motor 18 is performed in a preset zone (i.e., the first zone) immediately after the adjustment of the reclining angle is started, from among the zones between the reclining angle when the adjustment of the reclining angle is started and the target angle. However, the control to gradually increase the rotation speed of the motor 18 may also be executed to gradually increase the rotation speed of the motor 18 from the third speed to the fourth speed during a predetermined period of time immediately after the adjustment of the reclining angle is started. After step 408, the process returns to step 400 and the steps described above are repeated.

In step 410, the microcomputer 16 determines whether a preset stop condition is satisfied. In this determination, for example, the microcomputer 16 obtains the detection value from the sensor 20 via the sensor input circuit 32 and determines whether the detected reclining angle of the seatback 44 matches the preset target angle, whether a preset period of time has passed since the motor 18 started to operate at high speed, and whether the motor load has become equal to or greater than a preset load due to, for example, an object being caught in the seat adjusting mechanism or the like. If all of these determinations are no, the process returns to step 412 and the steps described above are repeated. However, if even one of these determinations is yes, the process proceeds on to step 414.

In step 412, the microcomputer 16 executes control to operate the motor 18 at a fixed rotation speed. That is, the microcomputer 16 controls the motor drive circuit 28 to fix the rotation speed of the motor 18 at fourth speed while monitoring the detection value from the sensor 20. After step 412, the process returns to step 400 and the steps described above are repeated.

In step 414, the microcomputer 16 determines whether the control to gradually decrease the rotation speed of the motor 18 has ended, as will be described later. If the determination is no, the process proceeds on to step 416. If the determination is yes, the process proceeds on to step 418.

In step 416, control to gradually decrease the rotation speed of the motor 18 is executed. That is, the microcomputer 16 controls the motor drive circuit 28 to gradually decrease the rotation speed of the motor 18 from the fourth speed. As a result, shock when the adjustment of the reclining angle is ended is reduced, thereby minimizing discomfort and annoyance to the occupant. Incidentally, the control to gradually decrease the rotation speed of the motor 18 is performed in a preset zone (i.e., the second zone) right before the adjustment of the reclining angle is ended (i.e., right before the reclining angle matches the target angle), from among the zones between the reclining angle when the adjustment of the reclining angle is started and the target angle. However, the rotation speed of the motor 18 may also be gradually decreased from the fourth speed until the motor 18 stops, within a predetermined period of time right before the adjustment of the reclining angle is ended. After step 416, the process returns to step 400 and the steps described above are repeated.

In step 418, the motor 18 is stopped. That is, the microcomputer 16 controls the motor drive circuit 28 to stop the motor 18. After step 418, the process returns to step 400 and the steps described above are repeated.

On the other hand, if the determination in step 400 is no and the process proceeds on to step 420, the microcomputer 16 determines whether the motor 18 is operating. That is, the microcomputer 16 determines whether the motor 18 is already operating in response to a command signal. If the determination is yes, the process proceeds on to step 422. If the determination is no, the process returns to step 400 and the step described above is repeated.

In step 422, the motor 18 is stopped. That is, a command signal had been output once but not thereafter, so the microcomputer 16 controls the motor drive circuit 28 to stop the motor 18 that is already operating. Incidentally, at this time, the motor 18 may be stopped after control is executed to gradually decrease the rotation speed of the motor 18 as in step 416. Also, control may be performed to return the position of the seat back 44 so that the reclining angle of the seat back 44 comes to match the reclining angle before the motor 18 had been operated. After step 422, the process returns to step S400 and the steps described above are repeated.

Also, if the determination in step 404 is no and the process proceeds on to step 424, control to operate the motor 18 at a fixed speed is performed. That is, if it is determined that there is not enough time until collision, the control to gradually decrease the rotation speed of the motor 18 is not executed. Instead, the microcomputer 16 controls the motor drive circuit 28 to fix the rotation speed of the motor 18 at the fourth speed, while monitoring the detection value from the sensor 20. As a result, the seat back 44 can be operated appropriately according to the predicted time-to-collision t. After step 424, the process proceeds on to step 426.

In step 426, the microcomputer 16 obtains the predicted time-to-collision t from the collision predicting ECU 46. That is, the microcomputer 16 obtains the predicted time-to-collision t by the predetermined time-to-collision t being output from the collision predicting ECU 46 in step 212 after the determination in step 207 is yes. After step 426, the process proceeds on to step 428.

In step 428, the microcomputer again determines whether there is enough time until collision based on the detection value from the sensor 20 at the time that step 426 is performed and the updated predetermined time-to-collision t, just as in step 404. If the determination is no, the process proceeds on to step 430. If the determination is yes, the process proceeds on to step 432.

In step 430, the microcomputer 16 determines whether a stop condition for the motor 18 is satisfied. In this determination, for example, the microcomputer 16 obtains the detection value from the sensor 20 via the sensor input circuit 32 and determines whether the detected reclining angle matches the preset target angle, whether a preset period of time has passed since the motor 18 started to operate at high speed, and whether the motor load has become equal to or greater than a preset load due to, for example, an object being caught in the seat adjusting mechanism or the like. If all of these determinations are no, the process returns to step 424 and the steps described above are repeated. However, if even one of these determinations is yes, the process proceeds on to step 418, and the motor 18 is stopped.

Also, in step 432, the microcomputer 16 determines whether a stop condition is satisfied, just as in step 410. If the determination is yes, the process proceeds on to step 434. If the determination is no, the process returns to step 424 and the steps described above are repeated.

In step 434, the microcomputer 16 determines whether the control to gradually decrease the rotation speed of the motor 18 has ended, as will be described later. In this determination, it is determined whether the control to gradually decrease the rotation speed of the motor 18, which is executed in step 436 described later in detail, has ended. If the determination is no, the process proceeds on to step 436. If the determination is yes, the process proceeds on to step 418, and the motor 18 is stopped.

In step 436, control to gradually decrease the rotation speed of the motor 18 is executed. That is, the microcomputer 16 controls the motor drive circuit 28 to gradually decrease the rotation speed of the motor 18 from the fourth speed. As a result, shock when the adjustment of the reclining angle is ended is reduced, thereby minimizing discomfort and annoyance to the occupant. Incidentally, the control to gradually decrease the rotation speed of the motor 18 is performed in a preset zone (i.e., the second zone) right before the adjustment of the reclining angle is ended (i.e., right before the reclining angle matches the target angle), from among the zones between the reclining angle when the adjustment of the reclining angle is started and the target angle. However, the rotation speed of the motor 18 may also be gradually decreased from the fourth speed until the motor 18 stops, within a predetermined period of time right before the adjustment of the reclining angle is ended. After step 436, the process returns to step 434 and the steps described above are repeated.

That is, in this example embodiment, when a collision is predicted by the collision predicting ECU 46 and a command signal is output, the seat control ECU 12 drives the motor 18 to adjust the reclining angle of the seat back 44 to the target angle (or within a target angle range). When the motor 18 starts to be driven at this time, control is executed to gradually increase the rotation speed of the motor 18 from the third speed to the fourth speed to adjust the reclining angle of the seat back 44. Therefore, shock when the seat back 44 is adjusted is reduced so discomfort and annoyance to the occupant can be minimized.

Also, when stopping the motor 18 after the reclining angle has reached the target angle, control is executed to gradually reduce the rotation speed of the motor 18 from the fourth speed and then stop the motor 18. Therefore, shock when the seat back 44 is adjusted is reduced so discomfort and annoyance to the occupant can be minimized when the adjustment of the seat back 44 is ended as well.

Moreover, in this example embodiment, it is determined whether the seat back 44 can be adjusted to the target angle before the collision, based on the predetermined time-to-collision t. If the seat back 44 is unable to be adjusted before the collision, control to gradually increase the rotation speed of the motor 18 will be prohibited, and the motor 18 is driven such that the rotation speed of the motor 18 will be fixed at the fourth speed. Therefore, the seat back 44 can be operated properly.

Further, in this example embodiment, it is further determined whether the adjustment of the reclining angle to the target angle will finish before the collision. If the adjustment of the reclining angle is unable to finish before the collision, control to gradually decrease the rotation speed of the motor 18 will be prohibited instead of being executed, and the motor 18 will be stopped. Therefore, the seat back 44 can be operated properly.

Furthermore, in this example embodiment, the predetermined time-to-collision t is updated as needed, and the determination result of whether control to gradually increase the rotation speed of the motor 18 or control to gradually decrease the rotation speed of the motor 18 can be executed is updated.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A vehicle seat control apparatus comprising:
an adjusting device that adjusts a reclining angle of a seat back of a vehicle seat;
a control portion that controls the adjusting device; and
a collision predicting portion that predicts a collision, wherein
when adjusting the reclining angle, the control portion controls the adjusting device to start adjusting the reclining angle at a first speed, and then after a predetermined period of time passes, the control portion controls the adjusting device to adjust the reclining angle at a second speed that is faster than the first speed, and
when the collision is predicted by the collision predicting portion, the control portion controls the adjusting device to start adjusting the reclining angle at a third speed that is faster than the first speed, and then after a predetermined period of time passes, the control portion controls the adjusting device to adjust the reclining angle at a fourth speed that is faster than the third speed, such that the reclining angle comes to match a target angle.

2. The vehicle seat control apparatus according to claim 1, further comprising:
an operating portion that is operated by an occupant and instructs the adjusting device to make an adjustment, wherein the control portion controls the adjusting device to start adjusting the reclining angle at the first speed when there is an instruction to make the adjustment from the operating portion.

3. The vehicle seat control apparatus according to claim 1, wherein
when the control portion controls the adjusting device to stop adjusting the reclining angle, the control portion controls the adjusting device to stop the adjustment after gradually decreasing an adjusting speed.

4. The vehicle seat control apparatus according to claim 1, wherein
the control portion controls the adjusting device to stop the reclining angle at the target angle after gradually decreasing the adjusting speed before the reclining angle reaches the target angle.

5. The vehicle seat control apparatus according to claim 1, wherein
a zone between the reclining angle when the adjustment is started and the target angle includes a preset first zone immediately after the adjustment of the reclining angle is started, a preset second zone immediately before the reclining angle reaches the target angle, and a third zone in between the first zone and the second zone; and
the control portion controls the adjusting device such that an adjusting speed of the adjusting device in at least one of the first zone and the second zone is slower than the adjusting speed in the third zone.

6. The vehicle seat control apparatus according to claim 5, wherein
the collision predicting portion calculates a predicted time-to-collision that is a predicted time until the collision occurs;
the control portion determines whether the reclining angle is able to be adjusted to the target angle within the predicted time-to-collision; and
the control portion controls the adjusting device to prohibit the adjustment at the third speed and start the adjustment at the fourth speed, when the control portion determines that the reclining angle is unable to be adjusted to the target angle within the predicted time-to-collision.

7. The vehicle seat control apparatus according to claim 6, wherein
the control portion predicts an operating time of the adjusting device based on an angular difference between the reclining angle and the target angle, and the adjusting speed of the adjusting device, and determines whether the reclining angle is able to be adjusted to the target angle within the predicted time-to-collision based on a predicted operating time and the predicted time-to-collision.

8. The vehicle seat control apparatus according to claim 6, wherein
the collision predicting portion updates the predicted time-to-collision; and
the control portion determines whether the reclining angle is able to be adjusted to the target angle within an updated predicted time-to-collision based on the updated predicted time-to-collision, and controls the adjusting device based on a determination result determined by the control portion.

9. The vehicle seat control apparatus according to claim 8, wherein after the control portion controls the adjusting device to prohibit the adjustment at the third speed and start the adjustment at the fourth speed, the control portion controls the adjusting device such that the adjusting speed in the second zone becomes slower than the adjusting speed in the third zone when it is determined that the reclining angle is able to be adjusted to the target angle within the updated predicted time-to-collision.

10. The vehicle seat control apparatus according to claim 1, wherein when the control portion controls the adjusting device to change an adjusting speed of the adjusting device, the control portion controls the adjusting device such that the adjusting speed changes gradually.

* * * * *